S. W. GOOCH.
FILING MACHINE.
APPLICATION FILED AUG. 14, 1911. RENEWED NOV. 16, 1912.

1,048,683.

Patented Dec. 31, 1912.

WITNESSES
Stephen Wach.
W. C. Lyon

INVENTOR
Shade W. Gooch
By Fredk W. Winter
Att'y.

UNITED STATES PATENT OFFICE.

SHADE W. GOOCH, OF NEW BRIGHTON, PENNSYLVANIA, ASSIGNOR TO THE GOOCH-KOEHLER SPECIALTY MANUFACTURING COMPANY, OF ROCHESTER, PENNSYLVANIA, A CORPORATION OF PENNSYLVANIA.

FILING-MACHINE.

1,048,683. Specification of Letters Patent. Patented Dec. 31, 1912.

Application filed August 14, 1911, Serial No. 643,994. Renewed November 16, 1912. Serial No. 731,873.

*To all whom it may concern:*

Be it known that I, SHADE W. GOOCH, a resident of New Brighton, in the county of Beaver and State of Pennsylvania, have invented a new and useful Improvement in Filing-Machines, of which the following is a specification.

This invention relates to implement for filing, buffing or polishing.

The object of the invention is to provide a power driven implement adapted to hold a file or similar tool, and which is to take the place of hand filing, buffing or polishing or like processes and by means of which better and more work can be done than by hand.

The invention comprises the construction and arrangement of parts hereinafter described and claimed.

Figure 1:
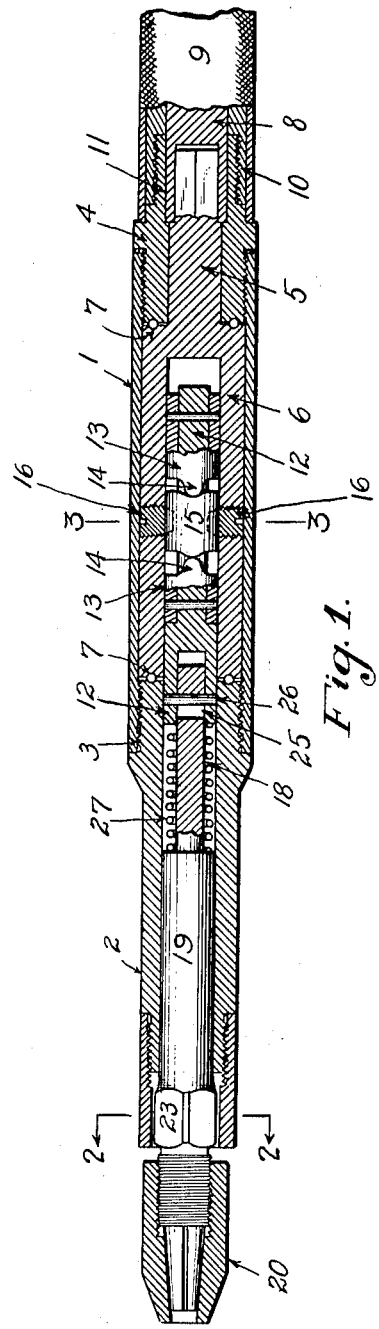
Figure 3:
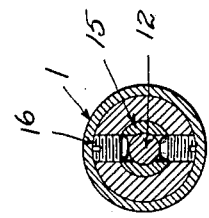
Figure 2:
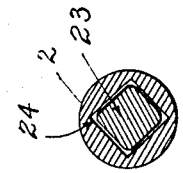

In the accompanying drawing, Figure 1 is a longitudinal section through the implement, and Figs. 2 and 3 are transverse sections taken respectively on the line 2—2 and 3—3, Fig. 1.

The particular implement illustrated in the drawing, is adapted to give a reciprocating movement to the file. The driving mechanism is entirely inclosed within a casing or shell which is formed in two parts, to-wit, a main or rear portion 1 of cylindrical form and a forward portion 2 of less diameter and also of cylindrical form, said casing members being united by the threaded joint 3. The rear end of the casing member 1 is closed by means of a bushing or plug 4 threaded into said casing and provided with an axial opening through which projects the shank 5 of the rotating driving shell or cylinder 6, the latter having a thrust bearing at one end against the inner end of the bushing 5 and at its opposite end against the end of the casing member 2. Balls 7 are preferably placed in suitable races between the ends of the cylinder 6 and the thrust shoulders to reduce friction.

The shank 5 at its rear or outer end is squared or otherwise formed to have connected thereto a driver, shown as a flexible shaft 8 inclosed in the sheathing 9 which is connected by a threaded collar 10 to an externally threaded projection 11 on the rear or outer end of the bushing 5.

Within the rotating shell or cylinder 6 is the reciprocating member or plunger 12 which has secured thereto, such as by cross pins, a pair of sleeves 13 provided with projections 14 spaced sufficiently far apart to receive therebetween a sleeve member 15 provided on its opposite ends with spiral faces contacting with the projections 14. The sleeve 15 is loose on the plunger 12 and is secured by suitable means, such as the oppositely disposed screws 16, to the rotating shell or cylinder 6. The sleeve 15 fills the space between the projections 14 on the sleeve 13, so that in the rotation of the shell 6 the spiral faces of sleeve 15 impart a reciprocating motion to plunger 12, as will be understood.

The forward end of plunger 12 is provided with an axial opening into which projects the reduced end 18 of shank 19 which has a loose fit in the member 2 of the casing and which at its outer end is provided with the chuck 20 for the file or other tool. The shank 19 is provided with a square or polygonal portion 23 reciprocating in a similarly shaped part 24 of the bore in casing member 2 so as to prevent rotation of the shank 19. The reduced end portion 18 of said shank is provided with a longitudinal slot 25 for receiving a pin 26 in the plunger 12, which pin and slot prevent relative rotation of the plunger 12 and shank 19, but permit slight relatively longitudinal movement of these parts. Interposed between the outer end of plunger 12 and the inner end of the larger portion of shank 19 and surrounding the reduced portion 18 of said shank is a helical spring 27 which is sufficiently strong to cause the tool holding shank to normally reciprocate as though it were a part of the plunger 12. Should the tool, however, meet with undue obstruction sufficient to practically stop the same, the spring will yield somewhat and permit the shell or cylinder 6 to continue rotation notwithstanding the stoppage of the tool. The implement has been designed particularly for filing ornamental figures and points of depression in glass molds, dies for stamping metal articles, and other similar molds and tools, and the like. In this class of work, the end of the file is liable to abut against the wall of the cavity and be stopped. When this happens, the spring 27 yields, as above stated.

In use the file or other tool is secured in chuck 20 and the driving mechanism, such as flexible shaft 8, is connected to the shank 5 of the cylinder 6. The implement is manipulated by merely gripping the shell or casing, which preferably is knurled on the exterior to give a good grip, and the tool thereby guided. The rotation of the cylinder 6 imparts reciprocating motion to the plunger 12, thereby imparting a reciprocating movement to the file or other tool. The tool can readily be moved to any position desired and should the file abut against a stationary part or meet with undue resistance, the spring 27 yields so that the driving cylinder or shell or connection therefrom to the plunger is not strained and the rotation of the cylinder is not interfered with. The plunger 12 with its sleeve has a long, fairly close fit in the interior of cylinder 6 and is thereby guided in its reciprocating movement, which insures smooth action and accuracy in the reciprocation of the tool, and also reduces wear of the reciprocating part in its bearings.

Obviously, any form of spiral or cam connection between the cylinder and plunger can be utilized, that shown being adapted to give two full reciprocations to the tool for each rotation of the cylinder.

Any suitable source of power may be utilized for driving the implement, and the connection to the rotating cylinder or shell 6 may be made in any desired or suitable way.

What I claim is:—

1. In an implement of the character described, the combination of a casing, a head closing one end of the casing, a rotary driving member in the casing having a driving connection through said head and having a thrust bearing at both ends in the casing, a reciprocating member having its axis in alinement with the rotating member and having a long cylindrical portion fitting in and guided in the rotary member and provided with projections spaced apart longitudinally, means for preventing rotation of said reciprocating member, and a sleeve secured to the rotary driving member and loose on the reciprocating member and located between said projections and provided with spiral end faces.

2. In an implement of the character described, the combination of a cylindrical casing, a rotary driving member therein having a driving connection through one end thereof and having a thrust bearing at both ends in said casing, a reciprocating member having its axis in alinement with that of the rotating member and having a long cylindrical portion fitting in and guided by a corresponding bore in the rotary member, said reciprocating member being provided with a portion of polygonal section reciprocating in a corresponding shaped bore in the casing, a pair of projections on said reciprocating member spaced apart, and a sleeve secured to the rotary driving member and loose on said reciprocating member and located between the projections thereon and provided with spiral end faces.

3. In an implement of the character described, the combination of a casing, a rotary driving cylinder therein having a driving connection through one end of the casing and a thrust bearing at both ends in the casing, a reciprocating member projecting through the opposite end of the casing, interengaging spiral operating connections between said rotary and reciprocating members, said reciprocating member being formed in two parts in axial alinement with each other, said two parts being relatively non-rotatable but endwise movable with reference to each other, and a spring between said parts.

In testimony whereof, I have hereunto set my hand.

SHADE W. GOOCH

Witnesses:
MARSHALL E. BROBECK,
JAMES W. DONEASTER.